US006064860A

United States Patent [19]

Ogden

[11] Patent Number: 6,064,860

[45] Date of Patent: May 16, 2000

[54] WIRELESS TRANSMISSION AND RECEPTION SYSTEM

[76] Inventor: Dan G. Ogden, 500 Altamaha Rd., Jesup, Ga. 31545

[21] Appl. No.: 08/985,167

[22] Filed: Dec. 4, 1997

[51] Int. Cl.[7] ................................ H04B 7/00; H04B 3/00; H04R 3/00

[52] U.S. Cl. .................................. 455/66; 381/80; 381/92

[58] Field of Search ................................ 455/66, 575, 90, 455/344, 351; 381/336, 92, 81, 74, 111, 370, 376, 80

[56] References Cited

U.S. PATENT DOCUMENTS

| | | | |
|---|---|---|---|
| 5,161,250 | 11/1992 | Ianna et al. | 455/66 |
| 5,493,697 | 2/1996 | May | 455/66 |
| 5,590,407 | 12/1996 | Ishikawa et al. | 455/66 |
| 5,771,441 | 6/1998 | Altstatt | 455/66 |

*Primary Examiner*—Edward F. Urban
*Assistant Examiner*—Sheila Smith

[57] ABSTRACT

A new audio wireless transmission and reception system for providing spectators at a sporting event audio perspective of the event. The inventive device includes a parabolic dish having a length of wire extending outwardly therefrom. The parabolic dish serves to receive audio signals. A transmitter is connected to the length of wire from the parabolic dish. The transmitter serves to transmit the audio signals received from the parabolic dish. The transmitter is removably positioned within a carrying case. The carrying case is positionable on a back of a technician directing the parabolic dish. A headset radio is adapted for being worn on a head of a wearer. The headset radio is programmed for receiving the audio signals from the parabolic dish via the transmitter.

3 Claims, 4 Drawing Sheets

WIRELESS TRANSMISSION AND RECEPTION SYSTEM

BACKGROUND OF THE INVENTION

1. Field of the Invention

The present invention relates to wireless headphones and more particularly pertains to a new audio wireless transmission and reception system for providing spectators at a sporting event audio perspective of the event.

2. Description of the Prior Art

The use of wireless headphones is known in the prior art. More specifically, wireless headphones heretofore devised and utilized are known to consist basically of familiar, expected and obvious structural configurations, notwithstanding the myriad of designs encompassed by the crowded prior art which have been developed for the fulfillment of countless objectives and requirements.

Known prior art wireless headphones include U.S. Pat. No. 4,845,751 to Schwab; U.S. Pat. No. 5,095,382 to Abe; U.S. Pat. No. Des. 358,817 to Chong; U.S. Pat. No. Des. 324,219 to Besasie; U.S. Pat. No. 4,037,052 to Doi; and U.S. Pat. No. 3,881,056 to Gibson et al.

While these devices fulfill their respective, particular objectives and requirements, the aforementioned patents do not disclose a new audio wireless transmission and reception system. The inventive device includes a parabolic dish having a length of wire extending outwardly therefrom. The parabolic dish serves to receive audio signals. A transmitter is connected to the length of wire from the parabolic dish. The transmitter serves to transmit the audio signals received from the parabolic dish. The transmitter is removably positioned within a carrying case. The carrying case is positionable on a back of a technician directing the parabolic dish. A headset radio is adapted for being worn on a head of a wearer. The headset radio is programmed for receiving the audio signals from the parabolic dish via the transmitter.

In these respects, the audio wireless transmission and reception system according to the present invention substantially departs from the conventional concepts and designs of the prior art, and in so doing provides an apparatus primarily developed for the purpose of providing spectators at a sporting event audio perspective of the event.

SUMMARY OF THE INVENTION

In view of the foregoing disadvantages inherent in the known types of wireless headphones now present in the prior art, the present invention provides a new audio wireless transmission and reception system construction wherein the same can be utilized for providing spectators at a sporting event audio perspective of the event.

The general purpose of the present invention, which will be described subsequently in greater detail, is to provide a new audio wireless transmission and reception system apparatus and method which has many of the advantages of the wireless headphones mentioned heretofore and many novel features that result in a new audio wireless transmission and reception system which is not anticipated, rendered obvious, suggested, or even implied by any of the prior art wireless headphones, either alone or in any combination thereof.

To attain this, the present invention generally comprises a parabolic dish having a length of wire extending outwardly therefrom. The parabolic dish serves to receive audio signals. A transmitter is connected to the length of wire from the parabolic dish. The transmitter serves to transmit the audio signals received from the parabolic dish. The transmitter is removably positioned within a carrying case. The carrying case is positionable on a back of a technician directing the parabolic dish. A headset radio is adapted for being worn on a head of a wearer. The headset radio is programmed for receiving the audio signals from the parabolic dish via the transmitter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new audio wireless transmission and reception system apparatus and method which has many of the advantages of the wireless headphones mentioned heretofore and many novel features that result in a new audio wireless transmission and reception system which is not anticipated, rendered obvious, suggested, or even implied by any of the prior art wireless headphones, either alone or in any combination thereof.

It is another object of the present invention to provide a new audio wireless transmission and reception system which may be easily and efficiently manufactured and marketed.

It is a further object of the present invention to provide a new audio wireless transmission and reception system which is of a durable and reliable construction.

An even further object of the present invention is to provide a new audio wireless transmission and reception system which is susceptible of a low cost of manufacture with regard to both materials and labor, and which accordingly is then susceptible of low prices of sale to the consuming public, thereby making such audio wireless transmission and reception system economically available to the buying public.

Still yet another object of the present invention is to provide a new audio wireless transmission and reception system which provides in the apparatuses and methods of the prior art some of the advantages thereof, while simultaneously overcoming some of the disadvantages normally associated therewith.

Still another object of the present invention is to provide a new audio wireless transmission and reception system for providing spectators at a sporting event audio perspective of the event.

Yet another object of the present invention is to provide a new audio wireless transmission and reception system which includes a parabolic dish having a length of wire extending outwardly therefrom. The parabolic dish serves to receive audio signals. A transmitter is connected to the length of wire from the parabolic dish. The transmitter serves to transmit the audio signals received from the parabolic dish. The transmitter is removably positioned within a carrying case. The carrying case is positionable on a back of a technician directing the parabolic dish. A headset radio is adapted for being worn on a head of a wearer. The headset radio is programmed for receiving the audio signals from the parabolic dish via the transmitter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
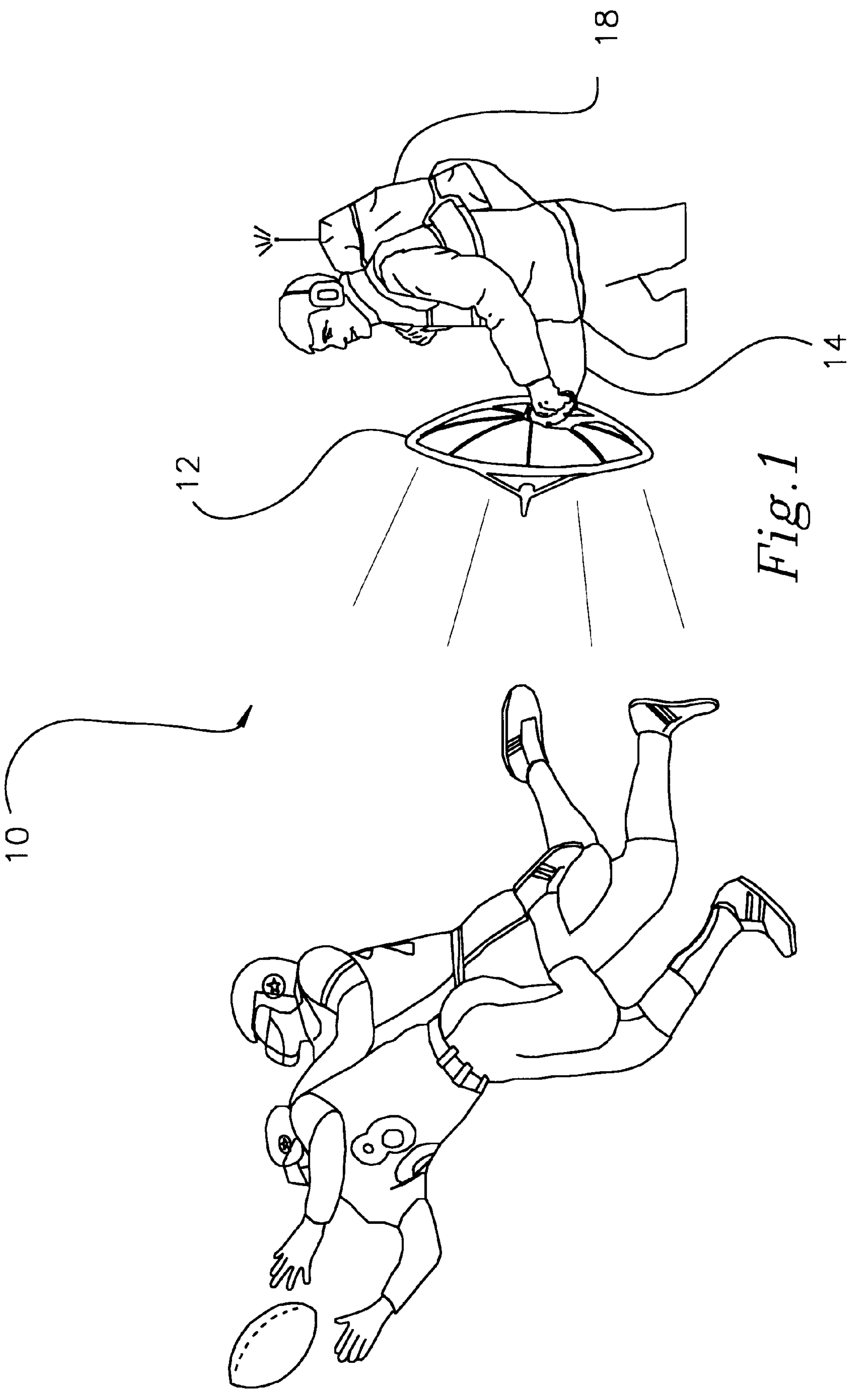
FIG. 1 is a side view of a new audio wireless transmission and reception system according to the present invention illustrated in use.
Figure 2:
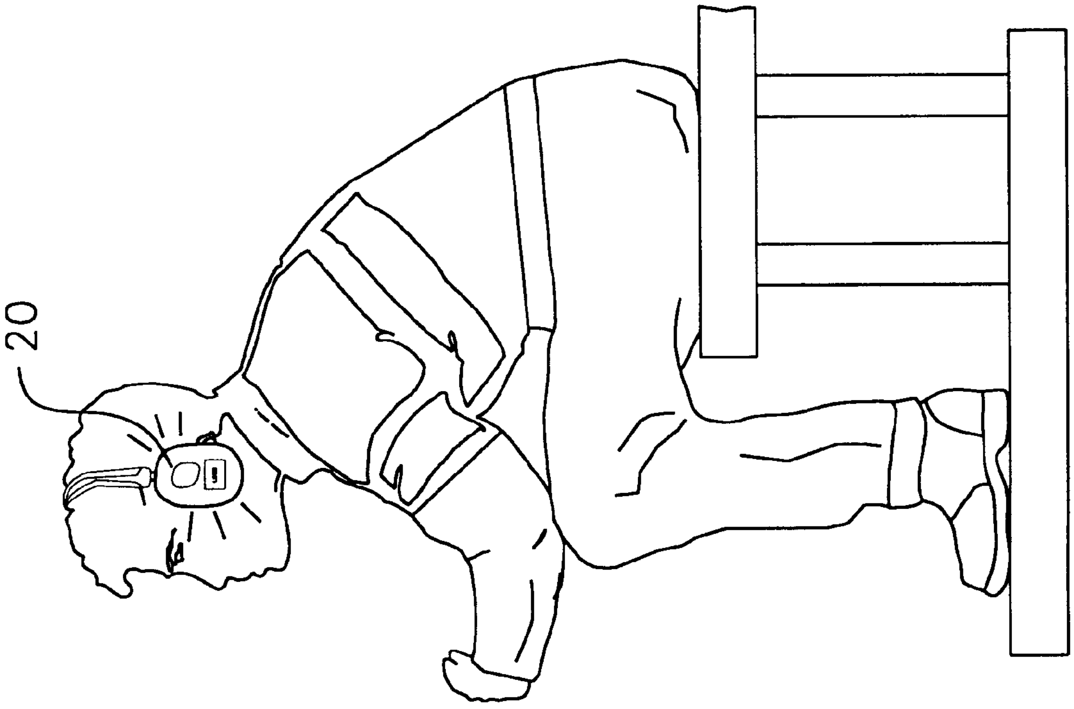
FIG. 2 is a side view of the headset radio of the present invention illustrated in use.
Figure 4:
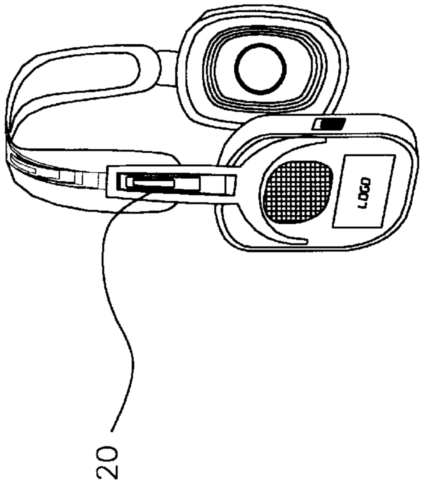
FIG. 4 is a perspective view of the headset radio of the present invention.
Figure 3:
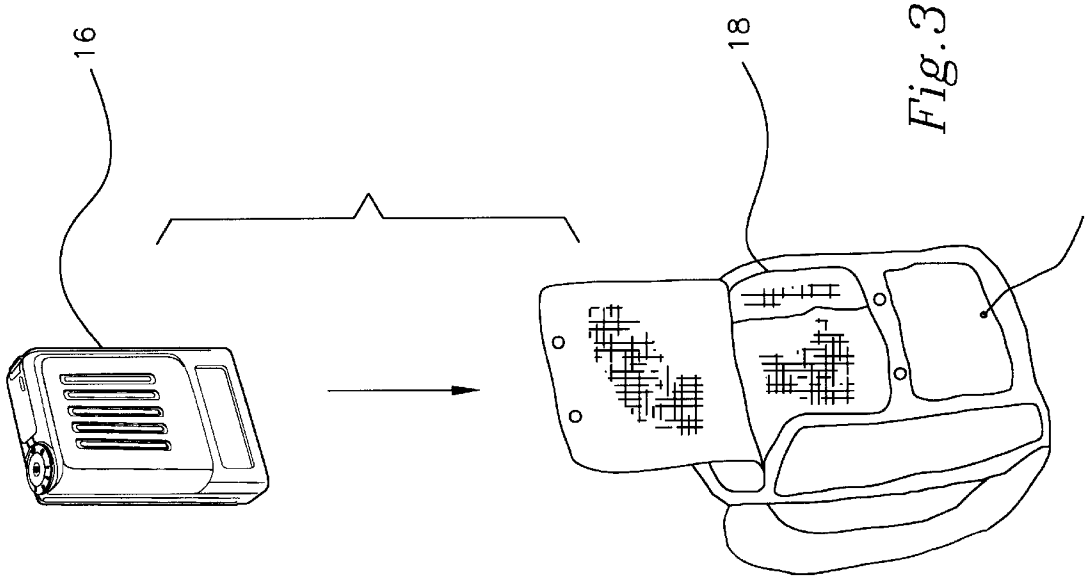
FIG. 3 is a perspective view of the transmitter and carrying case of the present invention.
Figure 5:
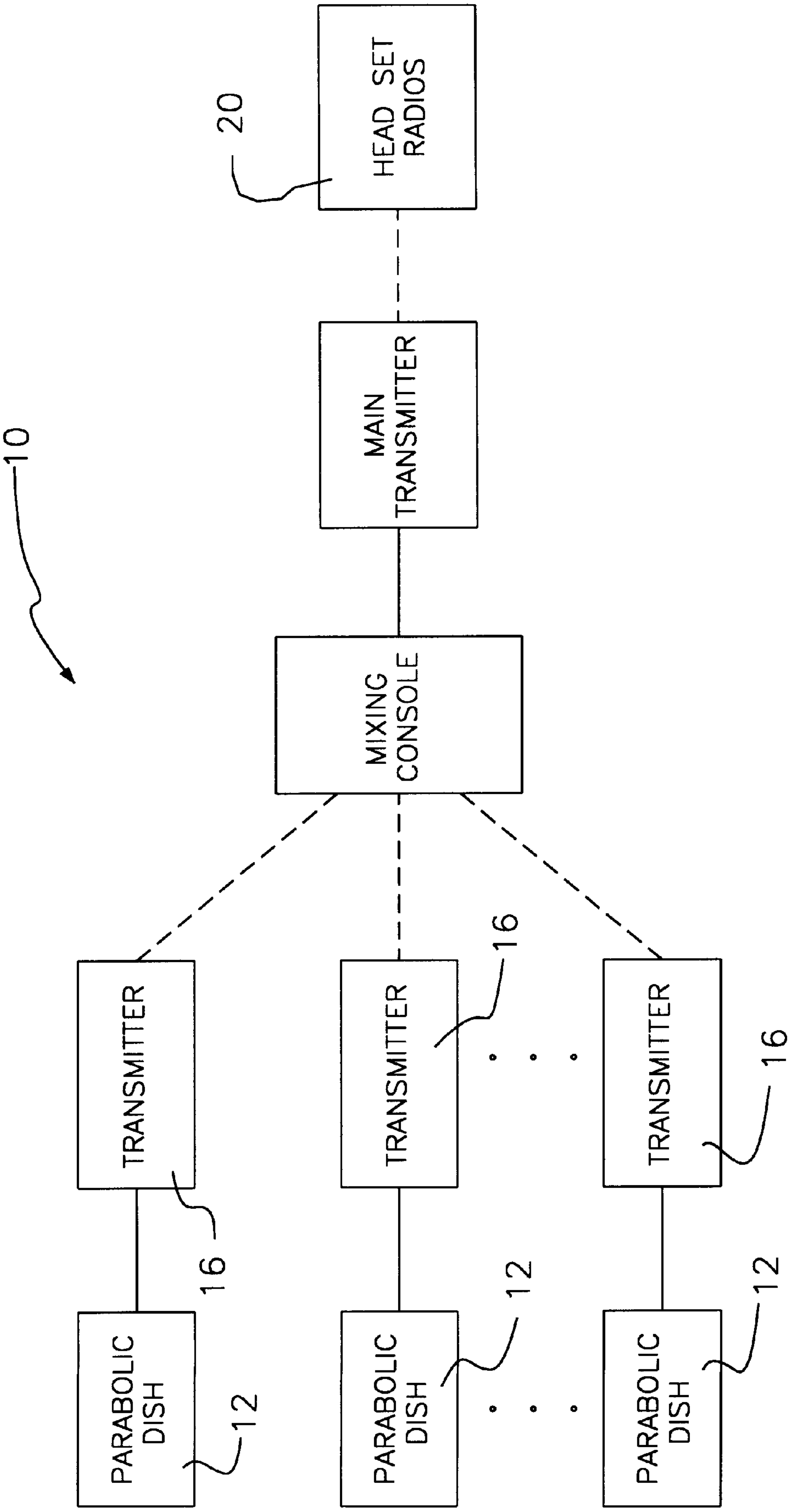
FIG. 5 is a block diagram of the system.

With reference now to the drawings, and in particular to FIGS. 1 through 4 thereof, a new audio wireless transmission and reception system embodying the principles and concepts of the present invention and generally designated by the reference numeral 10 will be described.

As best illustrated in FIGS. 1 through 4, the audio wireless transmission and reception system 10 comprises a parabolic dish 12 having a length of wire 14 extending outwardly therefrom. The parabolic dish 12 serves to receive audio signals.

A transmitter 16 is connected to the length of wire 14 from the parabolic dish 12. The transmitter 16 serves to transmit the audio signals received from the parabolic dish 12. The transmitter 16 is removably positioned within a carrying case 18. The carrying case 18 is positionable on a back of a technician directing the parabolic dish 12.

A headset radio 20 is adapted for being worn on a head of a wearer. The headset radio 20 is programmed for receiving the audio signals from the parabolic dish 12 via the transmitter 16.

In use, the present invention is an audio wireless transmission and reception system for stadiums, arenas, and other sport or event facilities that would permit the spectators to have a front-line audio perspective of the event. Such front-line audio action is suggested to be captures with the use of portable and highly directional electronic parabolic dishes 12 that would be carried by facility technicians. Each portable listening device 10 would be linked to a wireless transmitter 16 and the audio relayed to a control booth where the multiple transmissions would be combined on a professional audio mixing console. The resulting stereo audio output from this mixing console would be used to drive a low-power transmitter in the commercial AM or FM broadcast band, which could be heard throughout the facility but otherwise limited in its transmitting distance capability. Spectators could then listen to this front-line audio action using the headset radios 20. The headset radios 20 could also be imprinted with team and sponsor logos.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An audio wireless transmission and reception system for providing spectators at a sporting event an audio perspective of the event, the system comprising, in combination:

a plurality of parabolic dishes being portable for directing at distant sources of audible sound waves, each of the parabolic dishes being adapted for highly directional collecting of audible sound waves originating at a distance from the parabolic dish, each of the parabolic dishes having an interior surface adapted to focus the audible sound waves onto a microphone mounted at a focal point of the interior surface of the parabolic dish, the microphone being adapted to convert the audible sound waves into audio signals, the microphone of each of the parabolic dishes having a length of wire connected to the microphone and extending outwardly from the parabolic dish;

a plurality of transmitters, each of the transmitters being connected to the length of wire from one of the parabolic dishes, each of the transmitters serving to wirelessly transmit the audio signals received from the microphone of the parabolic dish connected thereto, each of the transmitters being removably positioned within a carrying case, each of the carrying cases being adapted for being worn as a backpack on a back of a technician directing the parabolic dish;

a headset radio adapted for being worn on a head of a wearer, the headset radio being adapted for wirelessly receiving the audio signals from the parabolic dish transmitted via the transmitter;

a mixing console; and a main transmitter for transmitting audio signals over a commercial broadcast band, the main transmitter transmitting audio signals received from the mixing console;

wherein each of the transmitters is adapted to transmit audio signals to the mixing console for being retransmitted to the headset radio; and wherein each of the transmitters is adapted to transmit audio signals to the mixing console for retransmission to the headset radio.

2. The system of claim 1 wherein the headset radio comprises an arcuate band with opposite ends and a pair of ear speakers each mounted on one of the opposite ends of the band.

3. The system of claim 1 wherein the headset radio has a logo marked thereon for corresponding to a team being observed by the spectator.

* * * * *